Patented Jan. 7, 1941

2,227,628

UNITED STATES PATENT OFFICE 2,227,628

FLUORINATION OF PHTHALOCYANINES

William Stansfield Calcott, Woodstown, N. J., assignor to E. I. du Pont de Nemours & Company, Wilmington, Del., a corporation of Delaware No Drawing. Application June 30, 1938,
Serial No. 216,853

5 Claims. (Cl. 260—314)

This invention relates to the fluorination of phthalocyanines and processes for the production thereof.

It is an object of the present invention to produce phthalocyanine compounds containing fluorine. A further object is to provide methods of fluorinating phthalocyanines. A still further object is to provide a process for introducing fluorine into phthalocyanine molecules by reaction which proceeds smoothly and without substantial decomposition of the phthalocyanine. Another object is to provide a process for the fluorination of phthalocyanines with elemental fluorine which may be operated smoothly and easily on a commercial scale. An additional object is the provision of catalysts for the fluorination of phthalocyanine with elemental fluorine. Other objects will appear hereinafter.

These objects are accomplished according to this invention whereby organic fluorine phthalocyanines are produced by reacting the phthalocyanine with fluorine in a reaction medium which is substantially inert to fluorine. The reaction may be effected with or without the use of catalysts.

Phthalocyanines are stable compounds under many conditions, but are sensitive to vigorous oxidation, by which the phthalocyanine complex is destroyed. It is, therefore, surprising that the direct action of fluorine can result in the substitution of fluorine in the phthalocyanine molecule instead of destroying it by oxidation.

While the invention is susceptible of considerable variation and modification in the manner of its practical application, the nature and proportions of the reactants, the temperature, pressure, and exact method of procedure, the following examples in which parts are by weight will serve to illustrate how the invention may be practiced.

*Example 1.*—Two parts by weight of chlorinated copper phthalocyanine (chlorine content 47%; obtained by chlorination of copper phthalocyanine with chlorine gas in an aluminum chloride-sodium chloride melt at a temperature of 200° C. containing cupric chloride) were mixed with fifty parts of substantially anhydrous hydrofluoric acid in a copper flask provided with an inlet tube of copper and a reflux condenser to return vaporized acid and serve as an outlet for excess fluorine. Fluorine (2.6 parts) was then passed over the reaction mixture, which was kept at a bath temperature of —10° C. The reaction mixture was mechanically shaken during the addition of the fluorine, and for an additional half hour after the flow of fluorine had been stopped. The diluent was then partially evaporated and the contents of the flask drowned in water and the residue washed until free of acid, and dried at 125° C. for two hours. The product thus obtained after drying was dissolved in a mixture of sulfuric acid and chloro-sulfonic acid. The resulting solution was drowned in hot water and the precipitate filtered, washed free of acid. This product tested in ink was bluer than the original highly chlorinated copper phthalocyanine. The dry pigment contained 6.6% fluorine.

*Example 2.*—Two parts of chlorinated copper phthalocyanine (same as in Example 1), fifty parts of substantially anhydrous hydrofluoric acid and six parts of antimony pentachloride were mixed in a copper flask. Fluorine (1.75 parts) was passed over the reaction mixture, which was kept in a bath at —10° C. The reaction mixture was shaken mechanically during the addition of fluorine and for an additional one-half hour after the flow of fluorine had been stopped. The diluent was then partially evaporated and the contents of the flask drowned in water, and treated as in the previous experiment. This pigment, after pasting, contained 5.1% fluorine.

*Example 3.*—Two parts of copper phthalocyanine and fifty parts of substantially anhydrous hydrofluoric acid were mixed in a copper flask, equipped as described in Example 1. Fluorine (1.75 parts) was then passed over the reaction mixture, which was kept at a bath temperature of —40° C. The reaction mixture was treated as in Example 1 and the final product contained, after pasting with sulfuric acid, 3.7% fluorine, (which corresponds to an average of 1.2 fluorine atom per molecule) and on testing in Litho varnish ink, was greener than the original copper phthalocyanine.

*Example 4.*—Two parts of copper phthalocyanine, fifty parts of anhydrous hydrofluoric acid and 20 parts of sublimed antimony trifluoride were mixed in a copper flask equipped as described in Example 1. Four parts of fluorine were then passed over the reaction mixture, which was kept at a bath temperature of —40° C. The experimental conditions were continued as in Example 1. The diluent was then evaporated and the contents of the flask drowned in water and filtered. After removal of the antimony salts with 20% hydrochloric acid, the residue was washed free of acid and dried at 125° C. This pigment, after pasting in sulfuric acid as in Example 1, was flushed with Litho varnish and tested as an ink, and was found much greener than the original copper phthalocyanine pigment.

*Example 5.*—Five parts by weight of copper phthalocyanine were mixed with fifty parts of substantially anhydrous hydrofluoric acid in a copper flask. 4.3 parts of fluorine were passed over the reaction mixture, which was kept at a temperature of approximately −72° C. The reaction mixture was mechanically shaken during the addition of fluorine and for an additional one-half hour after the flow of fluorine had been stopped. The diluent was evaporated and the contents of the flask drowned in water. After purification, two and one-half parts of pigment were obtained, which contained 18.9% fluorine, which corresponds to about 7 fluorine atoms per molecule.

*Example 6.*—Two parts by weight of copper phthalocyanine were mixed with fifty parts of substantially anhydrous hydrofluoric acid in a copper flask. Fluorine (1.75 parts) was passed over the reaction mixture, which was kept at a bath temperature of approximately 5° C. The pigment was worked up as described in the earlier experiments.

*Example 7.*—Four parts of copper phthalocyanine, twenty parts of SbF₃Cl₂ and forty parts of anhydrous hydrofluoric acid were placed in a pressure bomb which was heated in an oil bath at temperature of 150° C. for ten hours. The pressure was released and dilute hydrochloric acid was added to dissolve the antimony salts. The charge was filtered and the residue washed free of acid and dried. It was then pasted as in Example 1. A yield of one part of pigment was obtained. The pasted pigment was tested by flushing into a Litho varnish ink and was judged appreciably greener than the original pigment.

This invention is generally applicable for the preparation of fluorine substituted phthalocyanines. In place of copper phthalocyanine, other stable metallic phthalocyanines may be used, as for instance, iron phthalocyanines, nickel, cobalt, zinc, aluminum, chromium, and vanadyl phthalocyanines. Phthalocyanine itself (metal-free) may be fluorinated in a similar manner. The substitution products of phthalocyanines containing for instance chlorine, bromine, methyl, amino and sulfonic acid groups may be fluorinated. Phthalocyanines of higher molecular weight, as for instance those made from naphthalene-ortho-dinitriles or anthracene- or anthraquinone-ortho-dinitriles may also be fluorinated. The so-called "mixed phthalocyanines," that is, phthalocyanines containing for instance both benzo and naphtho or anthraquinonyl groups can be used, as well as the related substances symbolized by the compound octa-phenyl-porphyrazine, described by Linstead and Cook (Jour. Chem. Soc. 1937, 929).

The fluorine atoms substitute the hydrogen on the phenylene radicals. The resulting products are therefore nuclear fluorine derivatives, as distinguished from phthalocyanine compounds which may have fluorine on the metallic atom where the latter has a valence greater than two. The exact orientation of the substitution of fluorines for hydrogen is not known. It is probable that preferred positions are substituted first, and others later.

The fluorinated phthalocyanines are valuable blue to green pigments, having a greener shade than the unsubstituted compounds. They can be used in paints, inks, and as lakes. They can be co-pasted with vat dyes and other pigments to form desirable color combinations. They can be prepared in finely divided form by acid pasting with sulfuric acid, or chloro-sulfonic acid, or trichloro-acetic acid, followed by drowning in water, hot or cold, filtering, washing, and subsequently treating to insure special pigment properties. The less highly fluorinated products can be sulfonated. By vigorous treatment with metal phenoxy or alkoxy compounds or with aryl or alkyl amines the fluorine may be wholly or in part substituted by the respective radicals—phenoxy, alkoxy, aryl or alkyl amino groups, and these resulting compounds can be sulfonated and converted to lakes useful for the ordinary lake purposes.

In the claims below the expression a phthalocyanine compound is to be construed as referring to a compound which contains the fundamental ring structure of phthalocyanine, that is the configuration

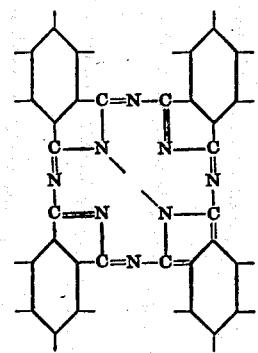

or any of its tautomeric forms, regardless of the nature of the substituents on the free valencies of the nitrogen atoms and the aryl rings.

I claim:

1. The process of producing a novel coloring matter, which comprises reacting with fluorine upon a phthalocyanine compound in liquid hydrogen fluoride.

2. The process of producing a novel coloring matter, which comprises reacting with fluorine upon a metal phthalocyanine in liquid hydrogen fluoride.

3. The process of producing a novel coloring matter, which comprises reacting with fluorine upon a copper phthalocyanine in liquid hydrogen fluoride.

4. The process of producing a novel coloring matter, which comprises reacting with fluorine upon chlorinated copper phthalocyanine in liquid hydrogen fluoride.

5. The process of producing a novel coloring matter, which comprises reacting with fluorine upon copper phthalocyanine in liquid hydrogen fluoride.

WILLIAM S. CALCOTT.